United States Patent
Ansari et al.

(10) Patent No.: US 9,083,692 B2
(45) Date of Patent: Jul. 14, 2015

(54) APPARATUS AND METHOD OF PROVIDING SECURITY TO CLOUD DATA TO PREVENT UNAUTHORIZED ACCESS

(71) Applicant: SAMSUNG ELECTRONICS CO., LTD., Suwon-si (KR)

(72) Inventors: Sariya Ansari, Noida (IN); Manoj Khandelwal, Noida (IN); Sumit Aggarwal, Noida (IN); Varun Mahajan, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 193 days.

(21) Appl. No.: 13/888,590

(22) Filed: May 7, 2013

(65) Prior Publication Data

US 2013/0298203 A1    Nov. 7, 2013

(30) Foreign Application Priority Data

May 7, 2012    (IN) .......................... 1750/CHE/2012
Apr. 5, 2013    (KR) ...................... 10-2013-0037698

(51) Int. Cl.
*H04L 29/06* (2006.01)

(52) U.S. Cl.
CPC .............. *H04L 63/08* (2013.01); *H04L 63/10* (2013.01); *H04L 69/24* (2013.01)

(58) Field of Classification Search
CPC combination set(s) only.
See application file for complete search history.

(56) References Cited

U.S. PATENT DOCUMENTS

| | | | |
|---|---|---|---|
| 2008/0104699 A1* | 5/2008 | Gounares et al. | 726/22 |
| 2010/0058049 A1 | 3/2010 | Fein et al. | |
| 2010/0217850 A1 | 8/2010 | Ferris | |
| 2010/0251328 A1* | 9/2010 | Syed et al. | 726/1 |
| 2011/0153727 A1 | 6/2011 | Li | |
| 2011/0167469 A1 | 7/2011 | Letca et al. | |

FOREIGN PATENT DOCUMENTS

| | | |
|---|---|---|
| KR | 10-2011-0067375 A | 6/2011 |
| KR | 10-2011-0070220 A | 6/2011 |

OTHER PUBLICATIONS

Lau, Phooi Yee et al., "Pay-As-You-Use On-Demand Cloud Service: An IPTV Case", 2010 International Conference on Electronics and Information Engineering, vol. 1, pp. V1-272-V1-276, 2010.

* cited by examiner

*Primary Examiner* — Beemnet Dada
(74) *Attorney, Agent, or Firm* — Sughrue Mion, PLLC

(57) ABSTRACT

A method and apparatus for providing security of an electronic apparatus are provided. The method includes identifying an environment of a client to be provided with a cloud service from at least one cloud server, determining one of an address size and an address range of a memory of the client used to execute a cloud process of the cloud service, and executing the cloud process, determining and storing a process state of the cloud process in response to the executing the cloud process in the memory, monitoring the cloud process accessing the at least one cloud server, and preventing an unauthorized access according to a result of the monitoring.

16 Claims, 15 Drawing Sheets

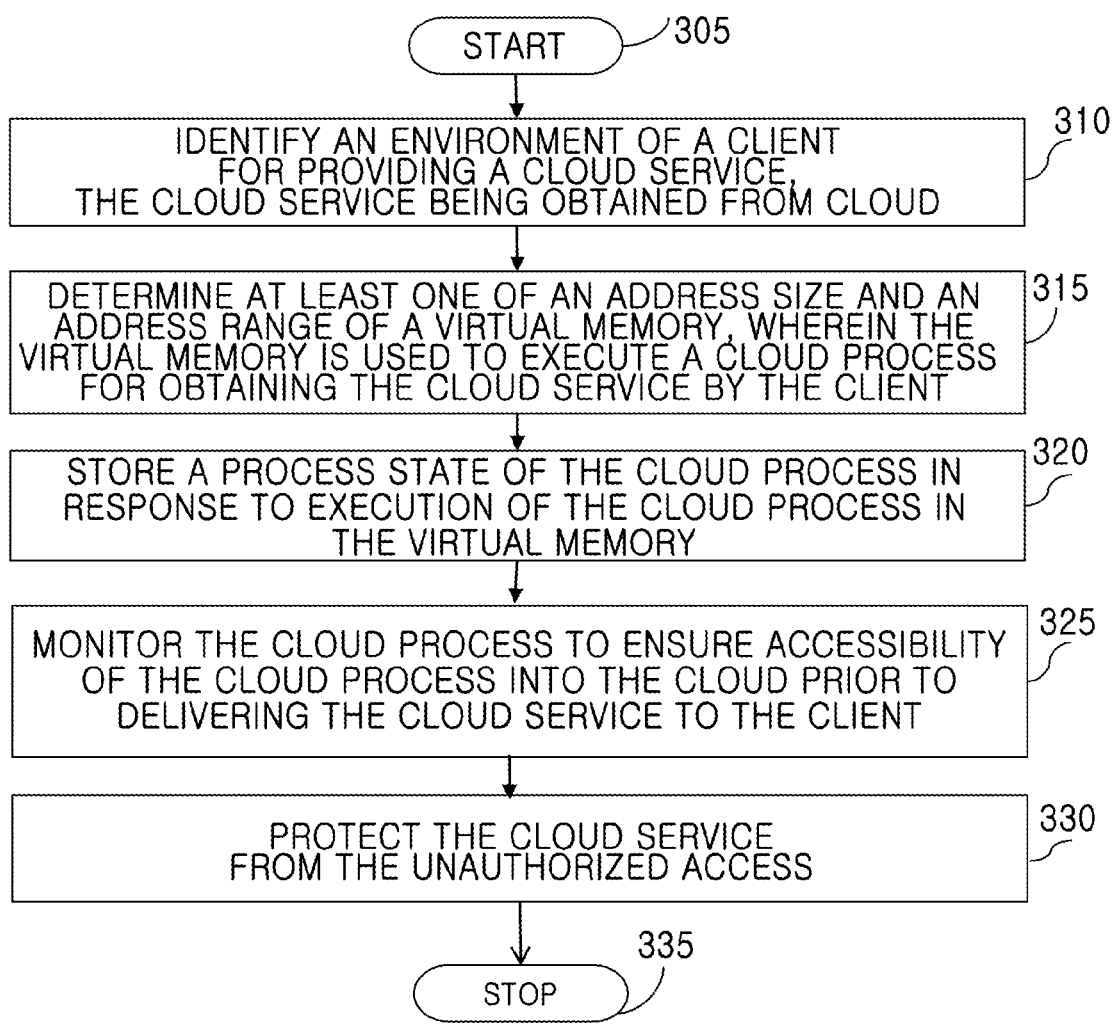

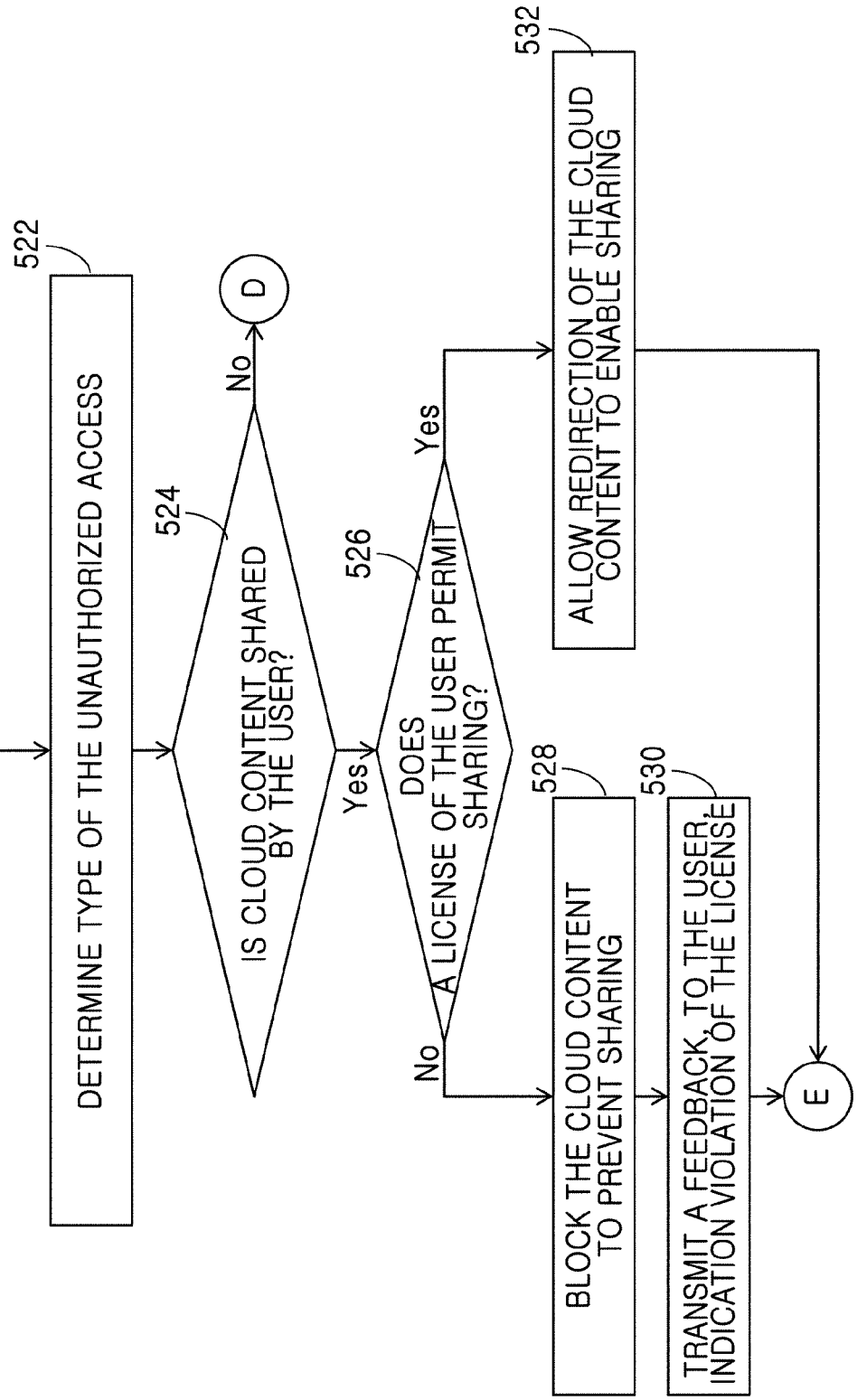

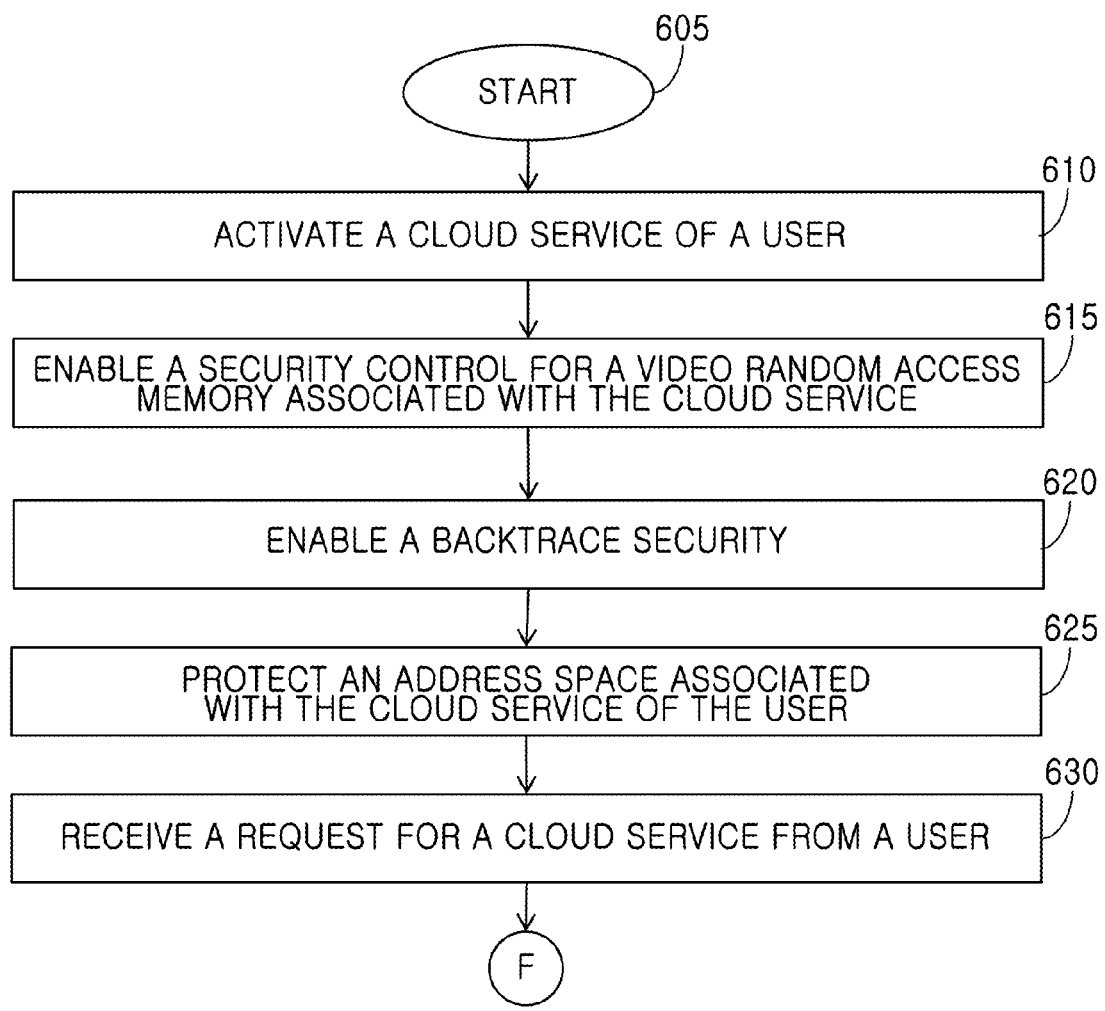

# APPARATUS AND METHOD OF PROVIDING SECURITY TO CLOUD DATA TO PREVENT UNAUTHORIZED ACCESS

CROSS-REFERENCE TO RELATED APPLICATIONS

This application claims priority from Indian Patent Application No. 1750/CHE/2012, filed in the Indian Patent Office on May 7, 2012, and the Korean Patent Application No. 10-2013-0037698, filed in the Korean Intellectual Property Office on Apr. 5, 2013, the disclosures of which are incorporated herein by reference.

BACKGROUND

Field

Aspects of the exemplary embodiments relate to a cloud computing field, and more particularly, to a cloud computing field which may provide a security function while a cloud service is provided.

Recently, cloud based computing is being widely utilized for rapid and scalable deployment of services. Examples of such services include, but are not limited to, IPTV services, virtual web stores, media outlets, e-stores, internet shops, web-shops and other online sites. Cloud based architecture deploys resources that can be hosted by a cloud service provider. Examples of resources include, but are not limited to, one or more processors, operating system, display devices, one or more storage devices and the like. The resources are coupled to each other to form a virtual machine.

The user can request the virtual machine from the cloud service provider for obtaining the services. The user can also request the virtual machine for performing one or more intended tasks. The virtual machine is controlled by a central server present in the cloud for providing the resources to perform the one or more intended tasks by the user. Further, the cloud based architecture includes several virtual machines that can be scaled on demand. Further still, the virtual machines included in the cloud architecture are communicably connected to a user utilizing an internet protocol (IP) network. However, security of data to prevent unauthorized access, for example, hacking of data from the cloud, is a major issue.

A method for providing security may include providing security at the central server side. The method provides various approaches for providing security controls, at the central server side, and to prevent unauthorized access. The various approaches include a network filter security, virtual machine security, operating system security, file security, file resource management security, endpoint security, virtual account security, process security, and application security. The central server can use one approach or a combination of approaches for providing the security controls. However, the method is restrained from providing security controls once the service, including an application or a processed data, is delivered to an electronic device, for example, a personal computer, a television, and a mobile phone, of the user. Upon delivering the application, the user can redirect the application to another client willingly or unwillingly. Hence, the method does not monitor unauthorized access once the application is delivered.

Further, other security controls, for example, anti-viruses, firewalls and the like also provide security of the data from the unauthorized access. Such security controls are employed for providing the security controls when the user complies security licenses, for preventing the unauthorized access, provided by the cloud service provider In one example, a first user can be accessing a cloud application provided by the cloud service provider. However, a second user can also be accessing the cloud application simultaneously by executing one or more processes. In this scenario, the second user is performing an unauthorized access to the cloud application. In one case, the first user may be ignorant of the unauthorized access performed by the second user. In another case the first user may intentionally share the cloud application with the second user. However, in both cases, the cloud service provider will be losing revenue, thereby incurring loss. Further, the unauthorized access poses several threats to cloud business.

In the light of the foregoing discussion, there is a need for an efficient method and a system for monitoring and preventing unauthorized access of cloud services.

SUMMARY

Exemplary embodiments relate to an electronic apparatus and a method for providing security to cloud data to prevent unauthorized access.

According to an exemplary embodiment, a method for providing security of an electronic apparatus is provided. The method includes identifying an environment of a client to be provided with a cloud service from at least one cloud server, determining one of an address size and an address range of a memory of the client used to execute a cloud process of the cloud service, and executing the cloud process, determining and storing a process state of the cloud process in response to the executing the cloud process in the memory, monitoring the cloud process accessing the at least one cloud server, and preventing an unauthorized access according to a result of the monitoring.

The method may further include determining a plurality of processes which are executed in the environment of the client, monitoring the plurality of processes accessing the at least one cloud server and delivering the cloud service to the client, and blocking at least one process which is denied access to the at least one cloud server from among the plurality of processes.

The method may further include updating system specific information and software specific information in order to monitor the plurality of cloud processes.

The method may further include updating the system specific information and the software specific information is performed in real time.

The monitoring may include determining whether an access of the cloud process is an unauthorized access, determining a type of the unauthorized access in response to determining the access of the cloud process is unauthorized, and the preventing the unauthorized access may include blocking the unauthorized access and reporting information regarding the unauthorized access to the at least one cloud server.

The type of the unauthorized access may include access which violates terms and conditions by a first user of the client and access by a second user who is not authorized to access the cloud service through the client.

The method may further include, in response to the reporting the information regarding the unauthorized access, updating a security function based on the information regarding the unauthorized access by a cloud service provider.

The method may further include suspending monitoring of the plurality of processes in real time and resuming monitoring of the plurality of processes in real time.

According to an exemplary embodiment, an electronic apparatus is provided. The electronic apparatus includes a communication unit (e.g., a transceiver, etc.) w which is configured to perform communication with at least one external cloud server, storage, and a processor which is configured to identify an environment of a client to be provided with a cloud service from the at least one external cloud server, determine one of an address size and an address range of a memory of the client used to execute a cloud process of the cloud service, execute the cloud process, determine and store a process state of the cloud process in response to the execution of the cloud process in the memory, monitor the cloud process accessing the at least one external cloud server, and prevent an unauthorized access according to a result of the monitoring.

The processor may be configured to determine a plurality of processes which are executed in the client environment, monitor the plurality of processes accessing the at least one external cloud server and deliver the cloud service to the client, and block at least one process which is denied access to the at least one external cloud serve from among the plurality of processes.

The storage may store system specific information and software specific information in order to monitor the plurality of cloud processes.

The processor may update the system specific information and the software specific information in real time.

The processor may further determine whether an access of the cloud process is an unauthorized access, determine a type of the unauthorized access in response to determining the access of the cloud process is unauthorized, control the communication unit to block the unauthorized access and report information regarding the unauthorized access to the at least one external cloud server.

The type of the unauthorized access may include access which violates terms and conditions by a first user of the client and access by a second user who is not authorized to access the cloud service through the client.

When information regarding the unauthorized access is reported, a security function may be updated based on the information regarding the unauthorized access by a cloud service provider.

The processor may suspend monitoring of the plurality of processes in real time and resume monitoring of the plurality of processes in real time.

According to an exemplary embodiment, a method for providing security of an electronic apparatus is provided. The method includes determining, on a client, a memory area used to execute a cloud process of a cloud service, executing the cloud process, monitoring the cloud process accessing the cloud service, and preventing an unauthorized access of the cloud process according to a result of the monitoring.

The monitoring the cloud process may include monitoring the memory area to determine if there is an unauthorized access of the cloud process.

The monitoring the memory area may include determining whether one or more processes of the client requesting access to the memory area are authorized to access the memory area.

The method may further include: determining a type of user performing the unauthorized access in response to determining that there is an unauthorized access of the cloud process, notifying the client of a violation of terms and conditions if the type of user performing the unauthorized access is an authorized user of the cloud service and the client; and notifying the client of an unauthorized user if the type of user performing the unauthorized access is an unauthorized user of the cloud service and the client.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 3 is a flowchart illustrating a method of providing security to cloud data to prevent unauthorized access according to an exemplary embodiment;

FIGS. 5A-5D are flowcharts illustrating a method of monitoring the cloud process to ensure accessibility of the cloud process into the cloud prior to delivering the cloud service to a user according to an exemplary embodiment;

FIGS. 6A and 6B are flowcharts illustrating a method of enabling security of cloud data according to an exemplary embodiment.

DETAILED DESCRIPTION OF EXEMPLARY EMBODIMENT

It should be observed the method elements and system components are represented by symbols in the figure, showing only specific details which are relevant for an understanding of the present disclosure. Further, details may be readily apparent to person ordinarily skilled in the art may not have been disclosed. In the present disclosure, relational terms such as first and second, and the like, may be used to distinguish one entity from another entity, without necessarily implying any actual relationship or order between such entities.

Exemplary embodiments of the present disclosure described herein provide a system and a method of providing security to cloud data to prevent unauthorized access.

Figure 1:
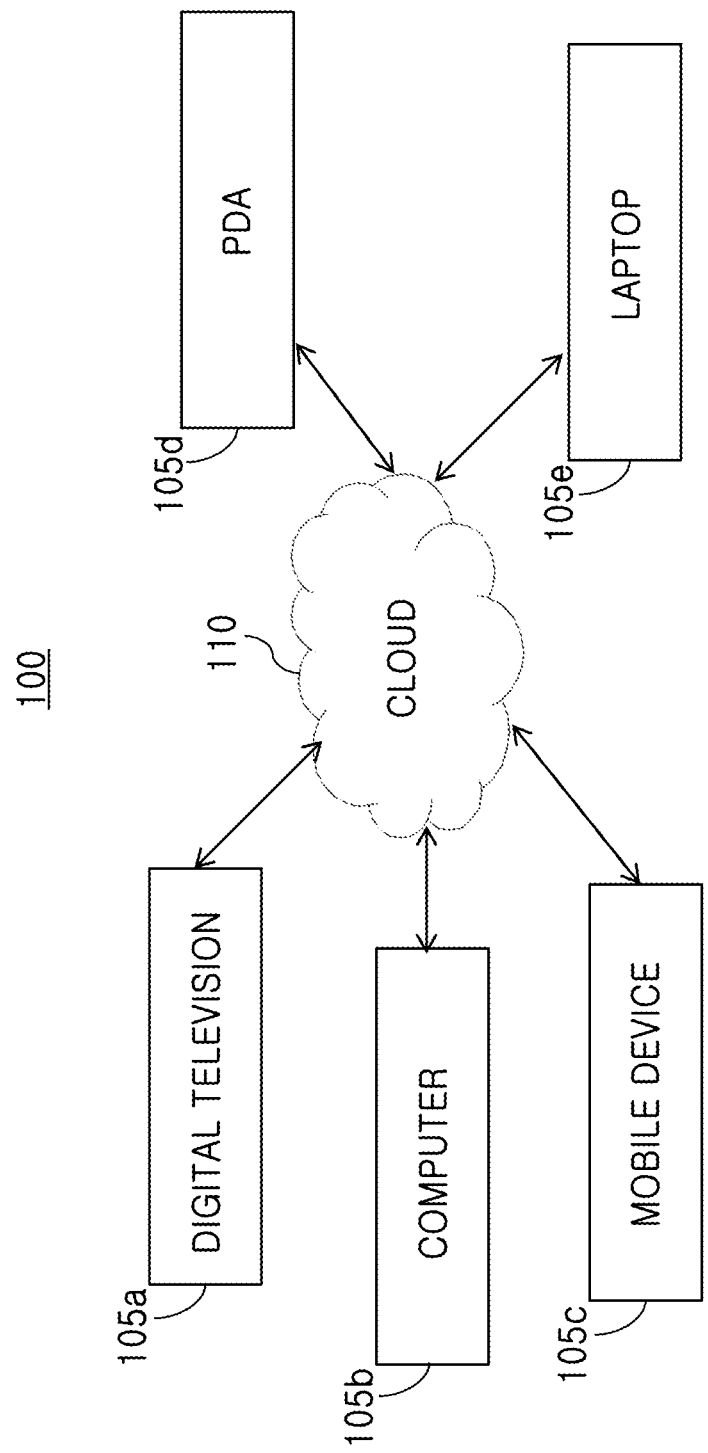
FIG. 1 is a block diagram of an environment in accordance with an exemplary embodiment.

FIG. 1 is a block diagram of an environment 100 according to an exemplary embodiment. The environment 100 includes various electronic devices, for example, a digital television 105a, a computer 105b, a mobile device 105c, a personal digital assistant 105d and a laptop 105e. The electronic devices are configured to obtain various cloud services from cloud 110.

Examples of the cloud services include, but are not limited to, IPTV services, various cloud applications, computing services, virtual web stores, media outlets, e-stores, internet shops, web-shops and other online sites that are present in the cloud 110. A user of an electronic device subscribes to a cloud service provider to obtain the cloud services. The user of the electronic device subscribed to the cloud service provider can also be referred to as a client. The user makes a request for obtaining a cloud service. Upon making the request, by the user, the cloud service provider, begins to process the request. Processing includes preparation of a virtual machine. Further upon preparation, the virtual machine is assigned to the user. One or more cloud processes associated with the cloud service, requested by the user, are executed in the virtual machine for providing the cloud service to the user.

In an exemplary embodiment, the electronic device is operable to provide security controls at the user end. The security controls are enabled prior to providing the cloud services to the user. The security controls prevent the user from performing unauthorized access to the cloud. Further, the security controls enable the cloud service provider to monitor unauthorized access to the cloud by the user, violation of terms and conditions associated with the cloud services and the like. Furthermore, the security controls also enable the cloud service provider to provide a feedback to the user when the user violates the terms and conditions or when the user performs unauthorized access to the cloud 110.

In one example, a television channel service provider provides multiple television channels to the user. However, the television channels provided may be limited. Further, the television channel service provider may be unable to provide foreign channels, for example, a Korean channel or a Dutch channel that the user wishes to watch. In such cases, the user can use IPTV services to obtain the foreign channels along with the television channels from the cloud 110. The cloud service provider ensures the IPTV services from the cloud 110 are provided to the user. The cloud service provider provides a license defining terms and conditions for accessing the IPTV services. Further, the security controls provided in accordance an exemplary embodiment ensure that the user is prevented from violating the license. Further, the security controls also ensure that the user is restrained from breaching the security and further hacking the IPTV services from the cloud 110 for sharing with other users in an unauthorized manner.

In an exemplary embodiment, the electronic device is operable to identify an environment of the user. The environment is identified to determine functioning of the cloud services. Examples of the functioning include, but are not limited to, determining a state of the cloud services, determining a category of unauthorized access, for example, directing the cloud services to the other users and determining violation of the terms and conditions, by the user.

Upon identifying the environment of the user, an address size and an address range of a memory, for example, a virtual memory, a flash memory or a random access memory (RAM) is determined. In one example, the memory can include a video random access memory (VRAM). The memory is used to execute various cloud processes that support the cloud services. Further, the state of the cloud services are determined and stored. In one example, number of cloud services that are in an active state is determined. The state of the cloud services are stored in a database, for example, a cloud client management system database. Hence, each user is associated with a cloud client management system database. Further, the database also includes a list of processes running in the environment of the user that are authorized to access the cloud 110. The database may be updated in real time to add processes to the list of processes that are authorized to access the cloud 110.

Furthermore, the electronic device is configured to monitor the list of processes to prevent unauthorized access to the client. In some embodiments, the list of processes authorized to access the cloud 110 is monitored for violation of the terms and conditions, for example, redirecting the cloud data to the other users, provided by the cloud service provider.

Processes included in the list of processes may be blocked if the processes attempt an unauthorized access to the cloud 110. Further, the processes violating the terms and conditions are also prevented access to the cloud 110.

Figure 2:
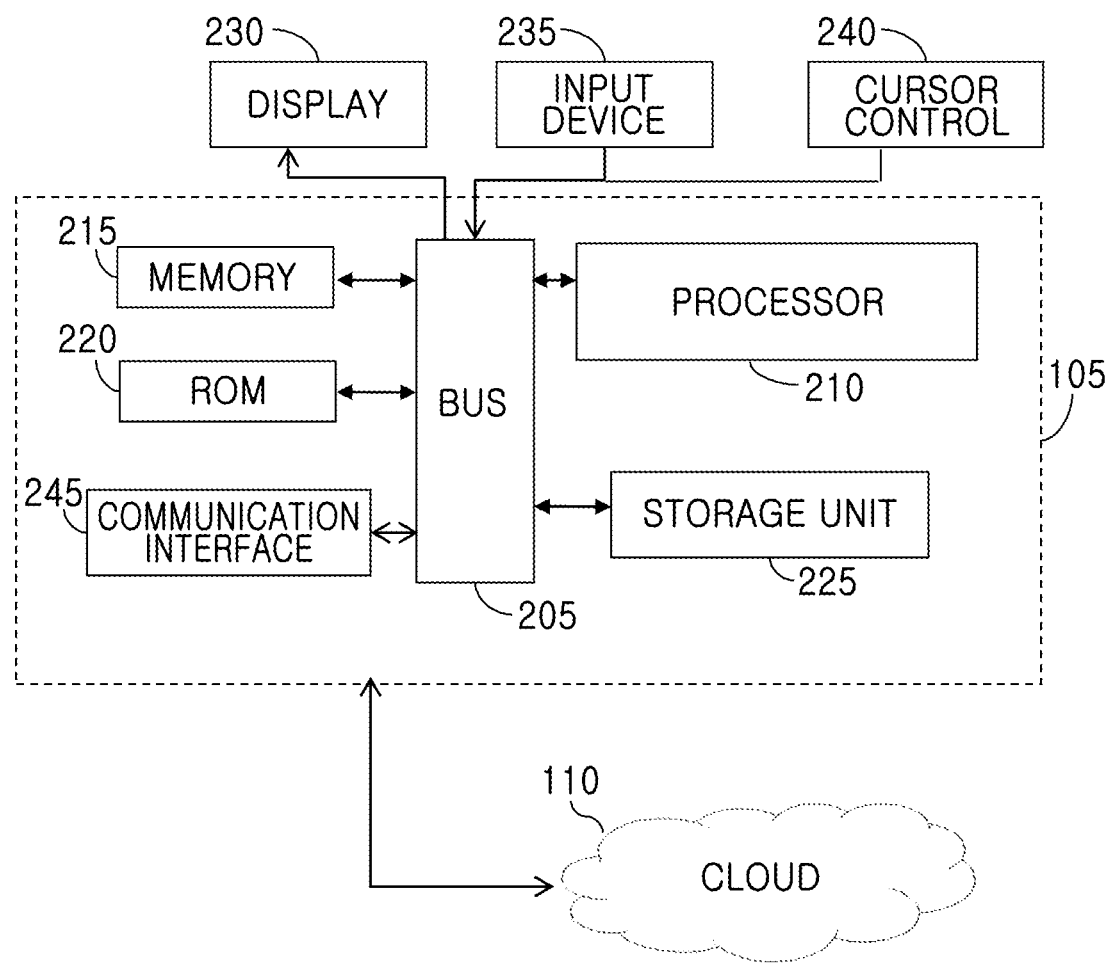
FIG. 2 is a block diagram of an electronic device which provides security to cloud data to prevent unauthorized access according to an exemplary embodiment.

An electronic device including a plurality of elements for providing security to cloud data to prevent unauthorized access is explained in detail in conjunction with FIG. 2.

FIG. 2 is a block diagram of an electronic device for providing security to cloud data to prevent unauthorized access, in accordance with an exemplary embodiment.

The electronic device 105 includes a bus 205 or other communication mechanism for communicating information, and a processor 210 coupled with the bus 205 for processing information. The electronic device also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The electronic device further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example information associated with various processes, running on the electronic device of a user, authorized to access the cloud 110.

The electronic device can be coupled via the bus 205 to a display 230, for example a cathode ray tube (CRT), for displaying cloud content requested by the user. The input device 235, including alphanumeric and other keys, is coupled to the bus 205 for communicating information and command selections to the processor 210. Another type of user input device is the cursor control 240, for example a mouse, a trackball, or cursor direction keys for communicating direction information and command selections to the processor 210 and for controlling cursor movement on the display 230.

Various exemplary embodiments are related to the use of the electronic device for implementing the techniques described herein. The techniques may be performed by the electronic device in response to the processor 210 executing instructions included in the memory 215. Such instructions can be read into the memory 215 from another machine-readable medium, for example the storage unit 225. Execution of the instructions included in the memory 215 causes the processor 210 to perform the process elements described herein.

The processor 210 may include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an exemplary embodiment implemented using the electronic device, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

The machine-readable media may be transmission media including coaxial cables, copper wire and fiber optics, including the wires that include the bus 205. Transmission media can also take the form of acoustic or light waves, such as those generated during radio-wave and infra-red data communications. Examples of machine-readable media may include, but are not limited to, a carrier wave as described hereinafter or any other media from which the electronic device can read. For example, the instructions can initially be carried on a magnetic disk of a remote computer. The remote computer can load the instructions into its dynamic memory and send the instructions over a telephone line using a modem. A modem local to the electronic device can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The electronic device also includes a communication interface 245 coupled to the bus 205. The communication interface 245 provides a two-way data communication coupling to the cloud 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. In any such implementation, the communication interface 245 sends and receives electrical, electromagnetic or optical signals that carry digital data streams representing various types of information.

The processor 210 in the electronic device is operable to identify an environment of a client for providing a cloud service from the cloud 110. The processor 210 is further operable to determine an address size and an address range of a virtual memory. The virtual memory is used to execute a cloud process for obtaining the cloud service by the user. Further, the processor 210 is operable to store a process state of the cloud process in response to execution of the cloud process in the virtual memory. In one embodiment, the processor 210 can include a cloud client management system database for storing the process state. Further, the cloud client management system database included in the processor 210 can also store a list of processes authorized to access the cloud 110. Furthermore, the processor 210 is configured to monitor the cloud process to ensure accessibility of the cloud process into the cloud for delivering the cloud service to the client. Moreover, the processor 210 is operable to protect the cloud service from the unauthorized access.

The processor 210 may also be operable to determine various processes executing in the electronic device of the user. The processor 210 may be further operable to monitor the processes to ensure accessibility of each of the processes into the cloud 110. Further, the processor 210 may be operable to block one or more processes of the various processes that are denied to access the cloud 110. Furthermore, the processor 210 may be operable suspend or resume monitoring of the processes in real time.

The processor 210 can be a part of a standalone operating system (OS), a cloud OS or a browser, for example, Firefox, Internet Explorer, Chrome and the like. The processor 210 configured for providing security to the cloud data can also be delivered as a cloud service, obtained from the cloud 110, provided by the cloud service provider.

A method of providing security to cloud data to prevent unauthorized access is explained in detail in conjunction with FIG. 3.

FIG. 3 is a flowchart illustrating a method of providing security to cloud data to prevent unauthorized access, in accordance with an exemplary embodiment. The method starts at operation 305. At operation 310, an environment of a client for providing a cloud service is identified. The client can obtain the cloud service by accessing the cloud 110. Examples of the cloud service include, but are not limited to, an IPTV service, a mail service, a computation service, a storage service and the like. Examples of the environment include, but are not limited to, a browser, cloud OS associated with a user and the like. Further, a state of the cloud service is also identified. The environment is identified for providing security of the cloud data while the user accesses the cloud 110.

At operation 315, an address size and an address range of a memory, for example, a virtual memory, a flash memory or a RAM is determined. The memory is used to execute a cloud process for obtaining the cloud service by the client. In one example, the address range and the address size of a VRAM is determined. In some embodiments, metadata supporting the cloud process is also determined. The memory and the metadata are used to identify the client such that the cloud service is secured from unauthorized access. Further, the memory and the metadata are used to identify malicious users accessing the cloud service in an unauthorized manner. Various mechanisms, for example, a calling graph mechanism and an access control mechanism can be used to identify the malicious users.

At operation 320, a process state of the cloud process in response to execution of the cloud process in the memory is determined. In one example, the cloud process may be in an active state. Hence, the active state of the cloud process is determined and thus stored. In another example, the cloud process may be in an inactive state. Hence, the inactive state of the cloud process is determined and thus stored.

The process state may be stored in a cloud client management system database associated with the client. Hence each client is associated with a corresponding cloud client management system database for storing a corresponding process state. The cloud client management system database may store list of processes, running on an electronic device of the client, authorized to access the cloud 110. If one or more processes included in the list of processes make a call to the cloud service, then the one or more processes are monitored to determine if the processes are authorized to access the cloud 110. Further, processes are monitored to determine if the processes are violating terms and conditions provided by a cloud service provider for accessing the cloud service.

At operation 325, the cloud process is monitored to ensure accessibility of the cloud process into the cloud for delivering the cloud service to the client. In one example, the client may enable a remote sharing application for sharing the cloud service to other users. In such cases, the client is violating the terms and conditions. Hence, the cloud process is monitored to identify the activation of the remote sharing application and further the remote sharing application is blocked such that other users are unable to access the cloud service. The cloud process is monitored in real time to prevent unauthorized access to the cloud 110. Further, the cloud process is also monitored to determine violation of the terms and conditions.

At operation 330, the cloud service is protected from the unauthorized access by the other users. Protection is performed by blocking one or more processes attempting to perform the unauthorized access into the cloud 110. The cloud service is also protected by notifying, to the cloud service provider, about the violation of the terms and conditions by the client. Further, operation 330 also includes providing a feedback to the cloud service provider that includes various cloud services used by the client. Further, the feedback can also include violation of the terms and conditions by the client.

The client may enable one or more new processes. In such cases prior to accessing the cloud 110, the new processes are monitored to determine if the new processes are authorized to access the cloud. Upon monitoring, processes among the new processes that are denied access to the cloud are blocked.

System specific information and software specific information associated with the client may be stored. The system specific information and the software specific information are used to monitor various processes and further used for preventing one or more processes from performing the unauthorized access to the cloud 110. The system specific information and the software specific information may be stored in a cloud client management system database. The system specific information and the software specific information are updated in real time prior to storing in the cloud client management system database. Further, one or more modifications in the system specific information and the software specific information are also updated in real time and further stored in the cloud client management system database.

In some embodiments, monitoring, of the cloud process can be suspended and resumed in real time. The method also defines a level of security controls that requires to be enforced on the client. The level of security controls can be defined in, for example, a license provided to the client.

Intrusions into the address space may be identified and further reported to the cloud service provider for preventing the unauthorized access to the cloud 110.

The method may also determine if a VRAM driver associated with the cloud process complies with security controls enforced prior to accessing the cloud 110. The method stops at operation 335.

Figure 4A:
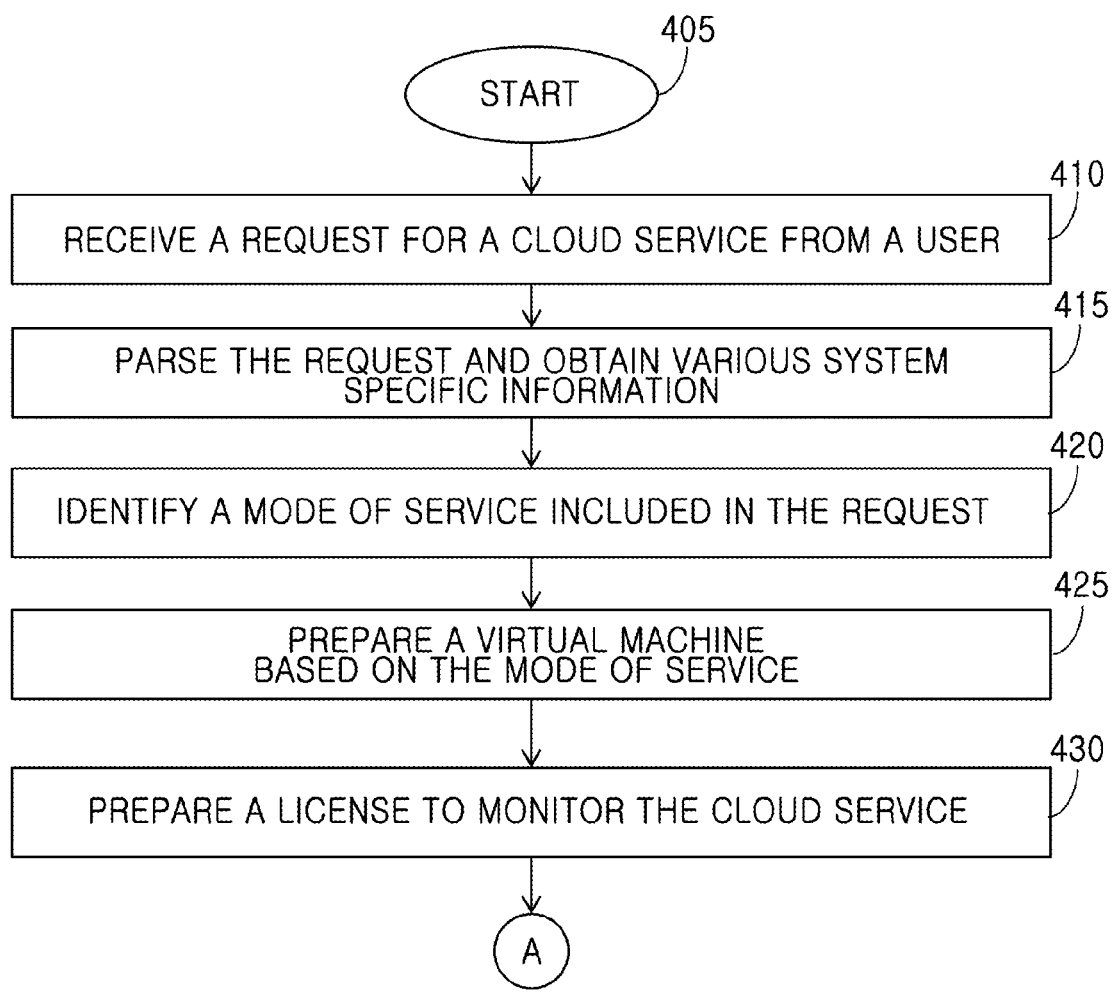
FIGS. 4A and 4B are flowcharts illustrating a method of delivering a cloud service to a user according to an exemplary embodiment.
Figure 4B:
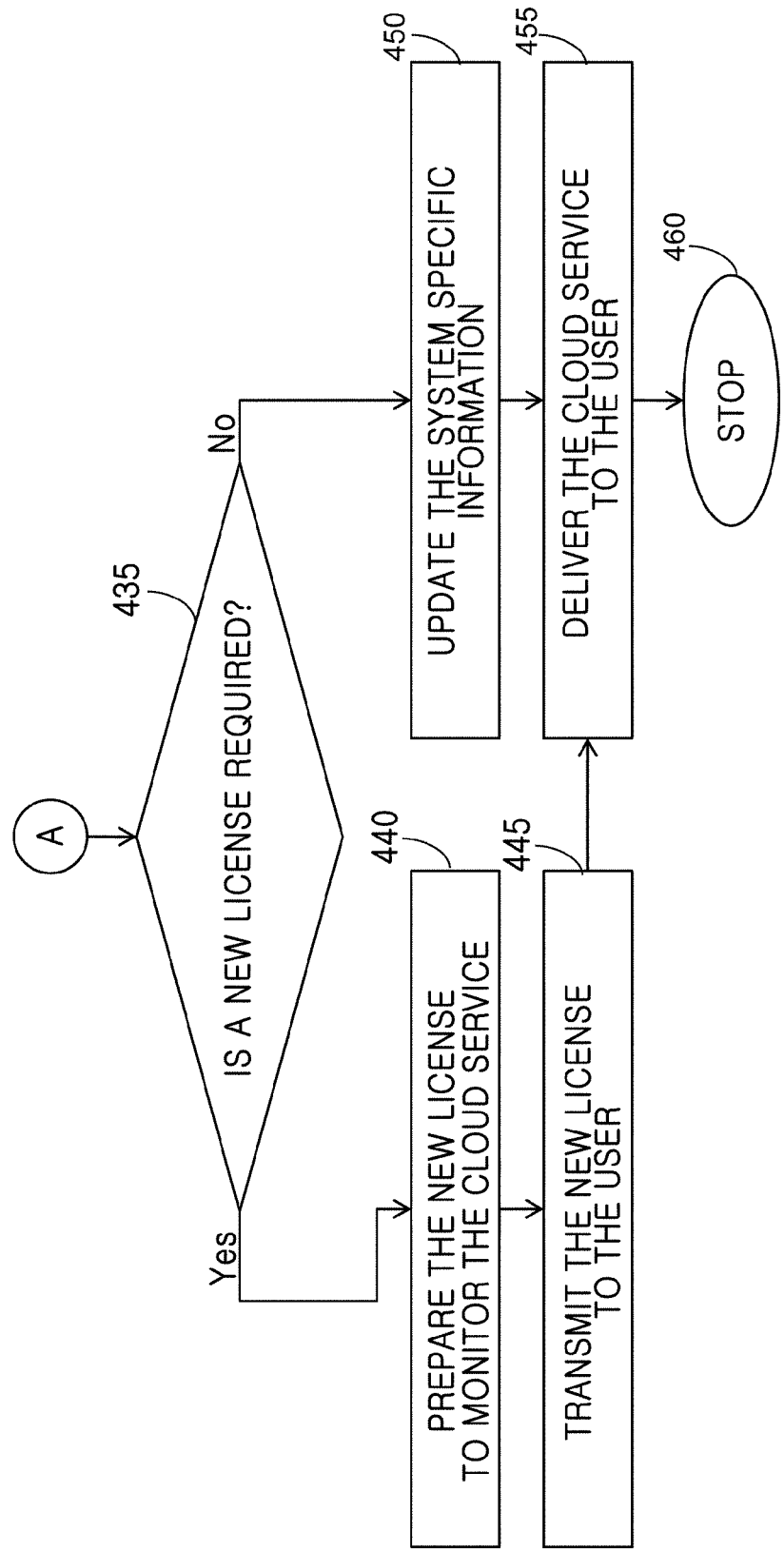
Figure 5A:
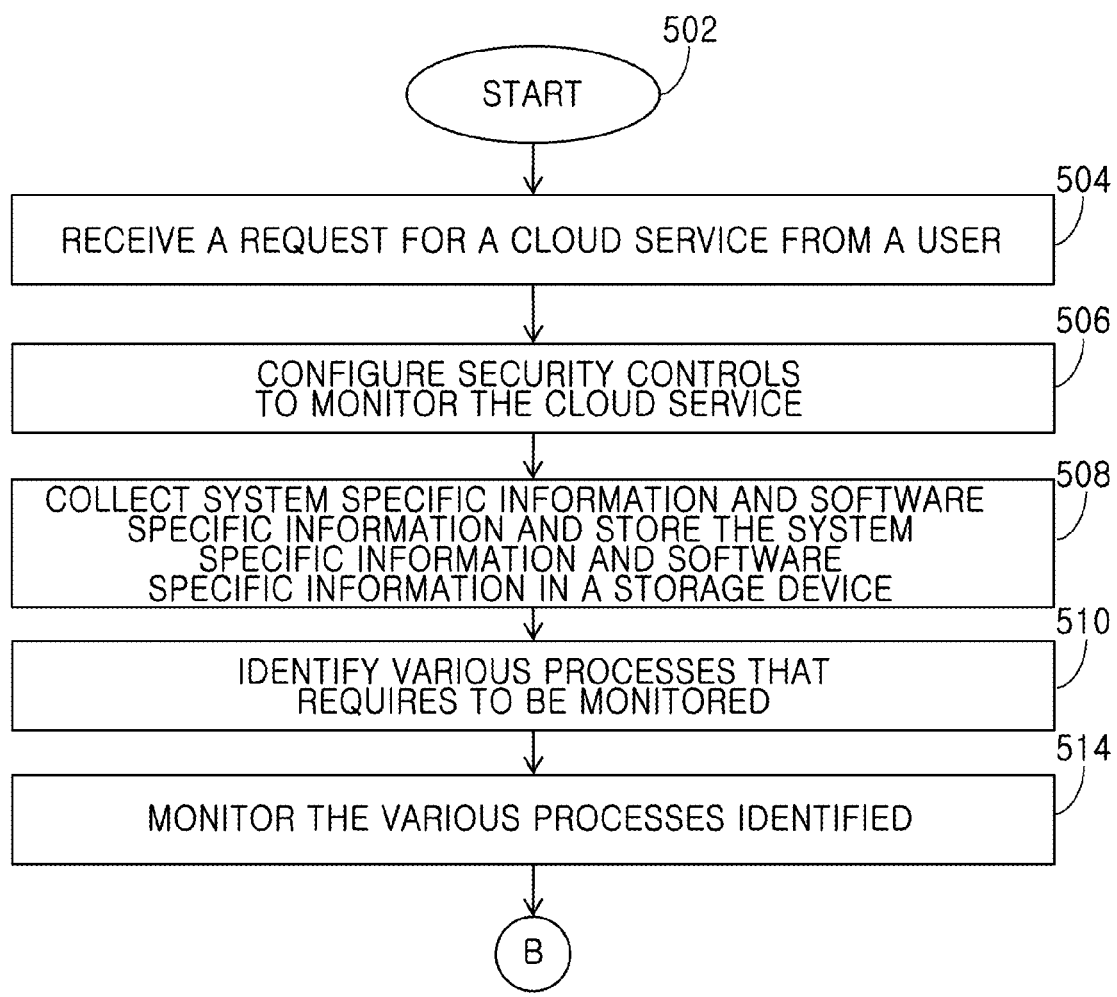
Figure 5B:
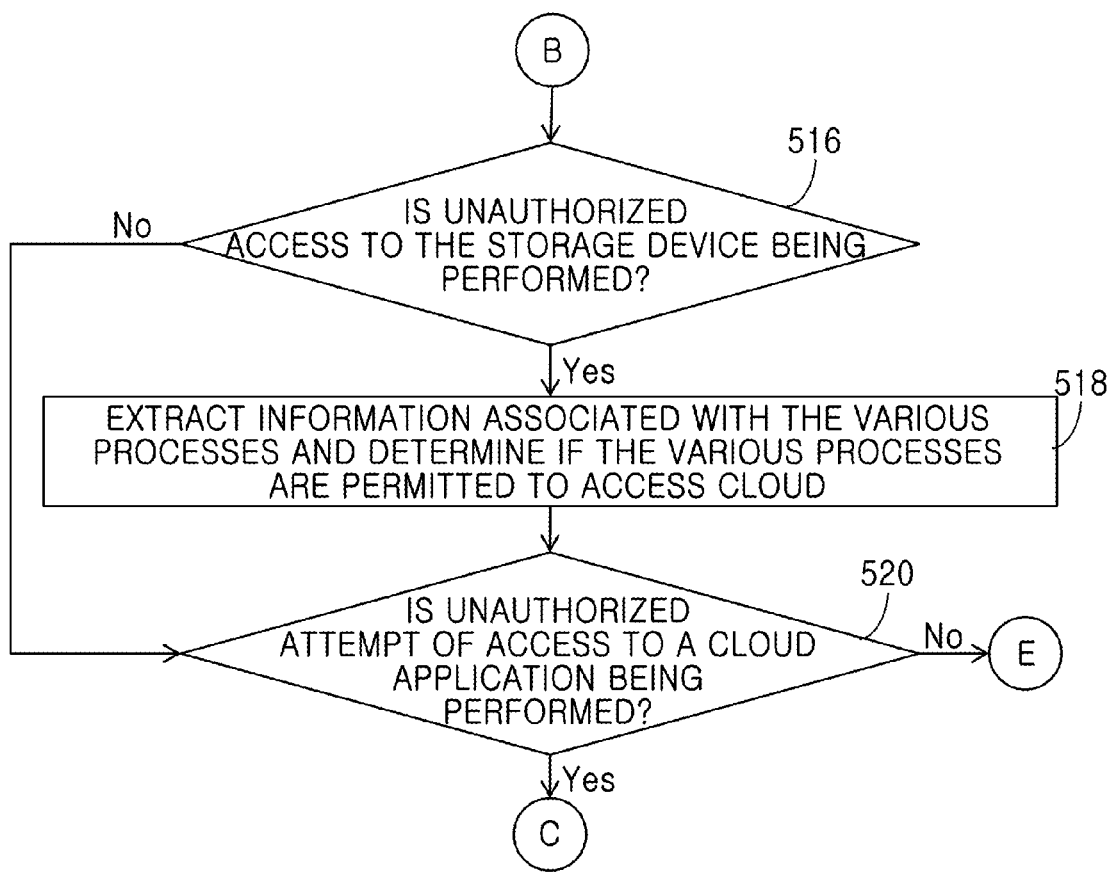
Figure 5D:
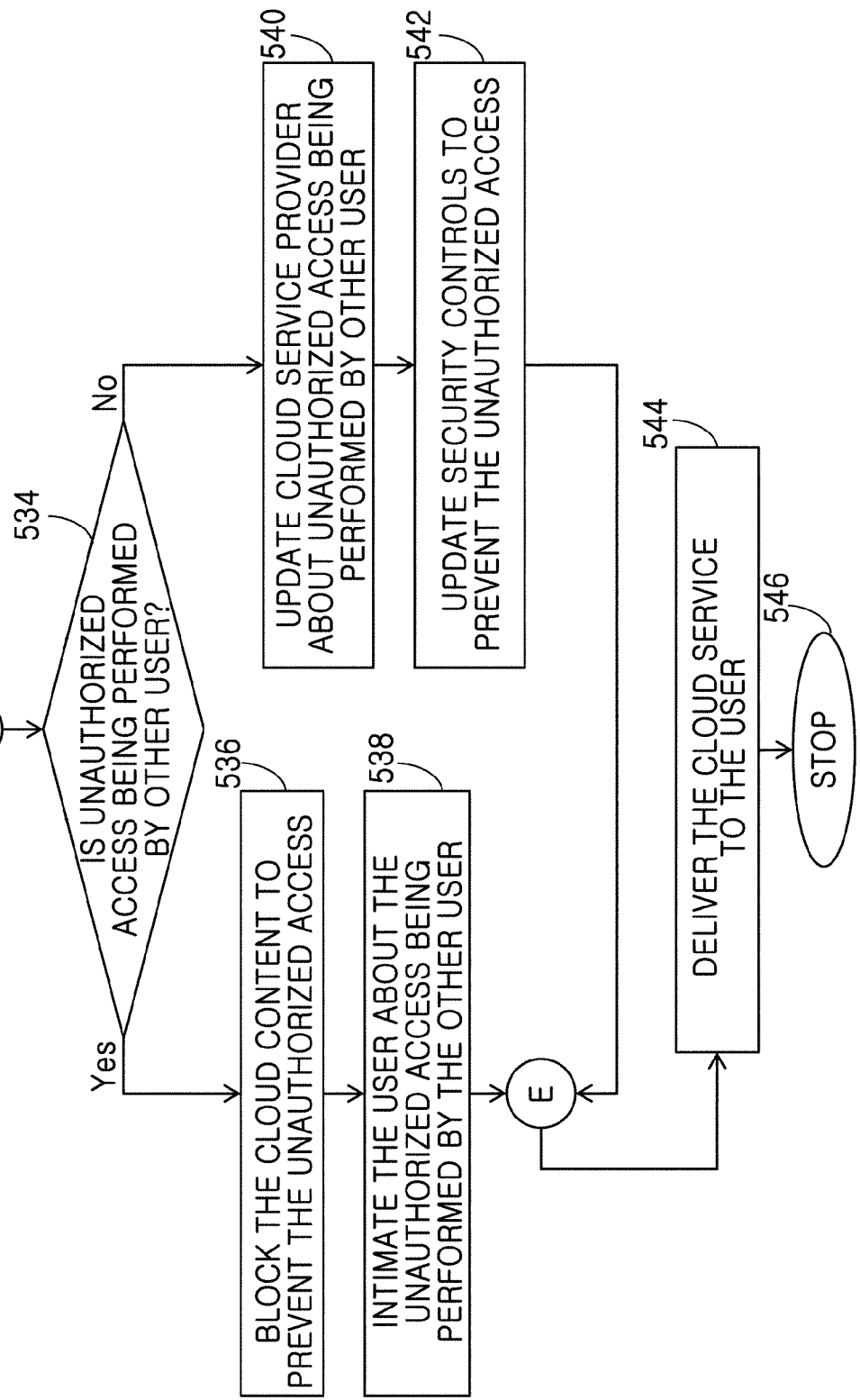

FIGS. 4A and 4B are flowcharts illustrating a method of delivering a cloud service to a user, in accordance with an exemplary embodiment. The method starts at operation 405.

At operation 410, a request for a cloud service is received from a user. Examples of the cloud service include, but are not limited to, an IPTV service, a mail service, a computation service, a storage service and the like. The request is made using an electronic device of a user.

At operation 415, the request is parsed to obtain system specific information. The request is also analyzed to obtain software specific information. Various parsing techniques can be used for parsing the request. The system specific information and the software specific information is used to determine various processes authorized to access the cloud 110. Further, the system specific information and the software specific information is used to determine processes that must be prevented or blocked from accessing the cloud 110.

At operation 420, a mode of service included in the request is identified. Examples of the mode of service include, but are not limited to, a cloud IPTV service, a data manipulation service, a main service, a computation service and the like. The mode of service is determined to process the request further.

At operation 425, a virtual machine is prepared based on the mode of service identified in operation 420. The virtual machine is used to execute one or more processes for delivering the cloud service to the user.

At operation 430, a license is prepared to monitor the cloud service. The license includes terms and conditions for a list of processes authorized to access the cloud 110. The license further prevents unauthorized access to one or more processes that are denied access to the cloud 110.

At operation 435, it is determined if a new license is required. If yes, then the method branches to operation 440. If no, then the method branches to operation 450. The new license is required when the user executes a new process.

At operation 440, a new license is prepared to monitor the cloud service. The new process is monitored to determine if the new process is authorized to access the cloud 110. The new license is prepared based on the accessibility of the new process into the cloud 110.

At operation 445, the new license is transmitted to the user. In one example, if the new process is authorized to access the cloud 110 then the new license is updated such that the new process is added to the list of processes authorized to access the cloud 110.

At operation 450, the system specific information is updated. The system specific information is updated to determine a list of processes authorized to access the cloud 110 and a list of processes that are denied access to the cloud 110.

At operation 455, the cloud service is delivered to the user. The method stops at operation 460.

FIGS. 5A-5D are flowcharts illustrating a method of monitoring the cloud process to ensure accessibility of the cloud process into the cloud prior to delivering the cloud service to a user.

The method starts at operation 502. At operation 504, a request for a cloud service is received from a user. In one example, the request can include a request for an IPTV service.

At operation 506, security controls are configured to monitor the cloud service. Configuring includes determining an address size and an address range of a memory, for example, a virtual memory, a flash memory or a RAM that is used to execute a cloud process to deliver the cloud service to the user. Configuring also includes determining a process state of the cloud process in response to execution of the cloud process in virtual memory.

At operation 508, system specific information and software specific information is collected. Examples of the system specific information and the software specific information include, but are not limited to, various processes executing on an electronic device of the user, an address range associated with each of the various processes, a map, VRAM driver details, user specific information and one or more user initiated processes. The system specific information and the software specific information are used to monitor various processes and further preventing one or more processes from performing an unauthorized access to the cloud 110. The system specific information and the software specific information also include a list of processes associated with the user authorized to access the cloud 110. Further, at operation 508, the system specific information and software specific information are stored.

At operation 510, various processes that require to be monitored are identified. The various processes may be executing on the electronic device of the user. The various processes that require to be monitored are stored in a storage device.

At operation 514, the various processes are monitored. Monitoring includes identifying if the various processes are authorized to access the cloud 110. The monitoring further includes identifying one or more processes that are denied access to the cloud 110. The monitoring can be performed by comparing process identifiers associated with each of the various processes to a list of process identifiers that are authorized to access the cloud 110.

At operation 516, it is determined if an unauthorized access to the storage device is being performed. If yes, then the method branches to operation 518. If no, then the method branches to operation 520.

At operation 518, information associated with the various processes is extracted. The information is used to determine if the various processes are permitted to access cloud 110.

At operation 520, it is determined if an unauthorized access to a cloud application that provides the cloud service is being performed. If yes, then the method branches to operation 522. If no, then the method branches to operation 544.

At operation 522, a type of the unauthorized access is determined. Examples of the types of the unauthorized access include, but are not limited to, violation of the terms and conditions by the user, unauthorized access performed by other user, for example, a hacker and the like.

At operation 524, it is determined if cloud content is shared by the user. The cloud content includes the cloud service, for example, a video included in a cloud television. If yes, then the method branches to operation 526. If no, then the method branches to operation 534.

At operation 526, it is determined if a license of the user permit the user to share the cloud content with other users. The license may be provided by a cloud service provider. If yes, then the method branches to operation 532. If no, then the method branches to operation 528.

At operation 528, the cloud content is blocked to prevent sharing. The cloud content is blocked since the license of the user prevents sharing of the cloud content with the other users. Further, blocking the cloud content prevents the user from violating the license.

At operation 530, a feedback is transmitted to the user. The feedback indicates, to the user, about violation of the license. Further, the feedback indicates, to the user, to cease sharing of the cloud content.

At operation 532, the cloud content is redirected to enable sharing. Sharing of the cloud content is enabled since the license of the user permits sharing. The license may also specify number of users permitted to access the cloud client thereby preventing numerous unauthorized accesses.

At operation 534, it is determined if an unauthorized access is being performed by another user, for example, a hacker. If yes, then the method branches to operation 536. If no, then the method branches to operation 540.

At operation 536, the cloud content is blocked to prevent the unauthorized access. One or more algorithms can be used for enabling blocking of the cloud content from the unauthorized access.

At operation 538, the user is notified about the unauthorized access that is being performed by the other user. Notification is performed so that the user is aware of the unauthorized access. Further, the notification enables the user to take precautionary measures to prevent the unauthorized access.

At operation 540, a cloud service provider is updated about the unauthorized access that is being performed by the other user.

At operation 542, security controls are updated to prevent the unauthorized access. The security controls is updated by the cloud service provider.

At operation 544, the cloud service is delivered to the user. The method stops at operation 546.

Figure 6B:
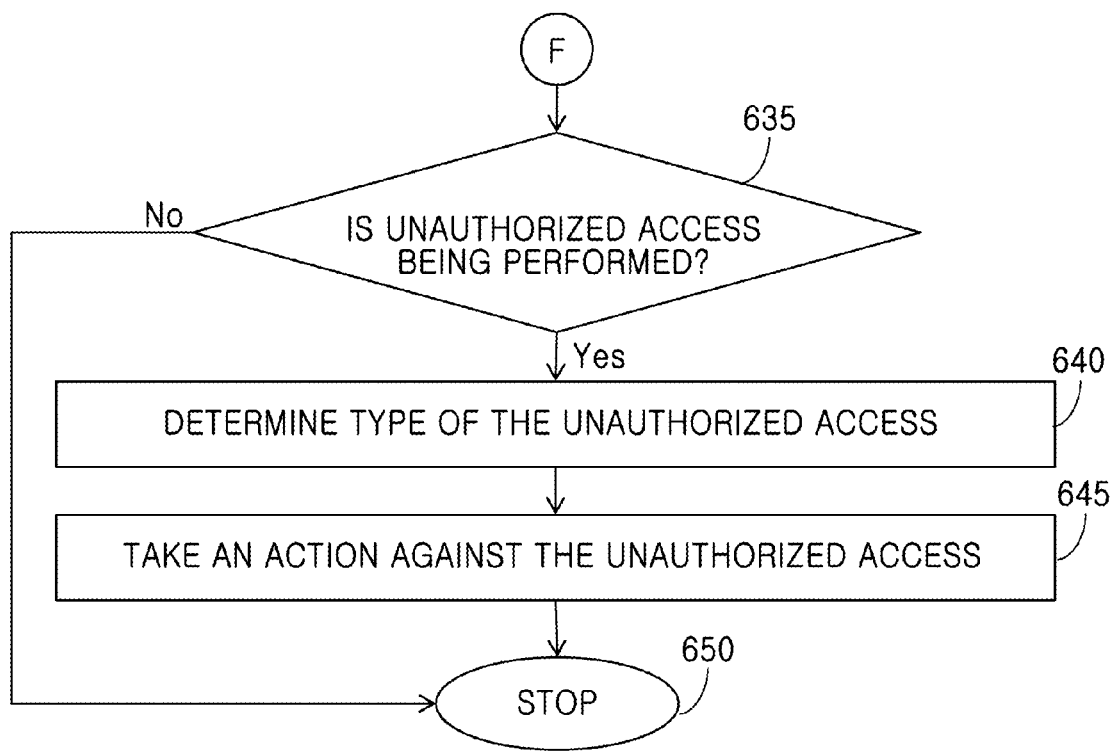
Figure 7A:
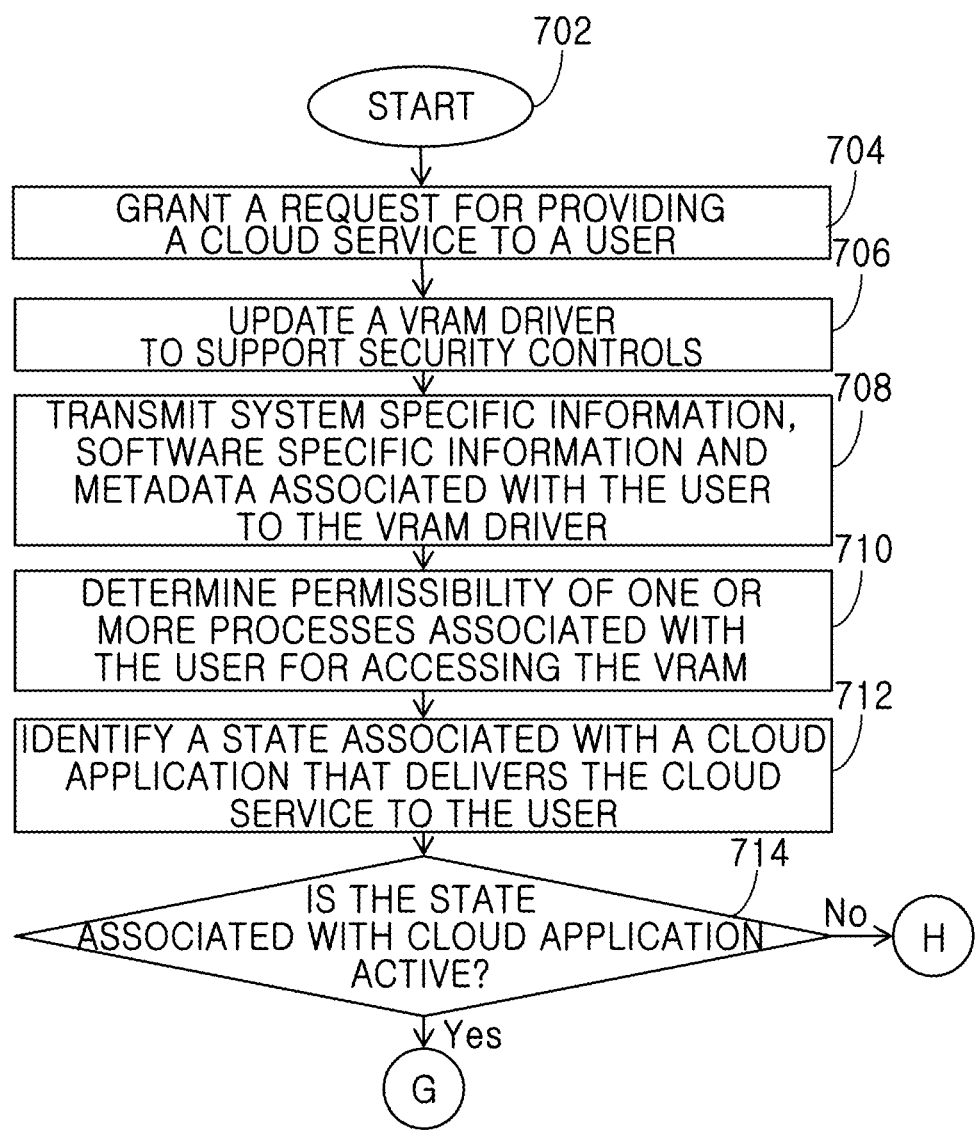
FIGS. 7A-7D are flowcharts illustrating a method of monitoring and protecting a cloud application from unauthorized access according to an exemplary embodiment.
Figure 7B:
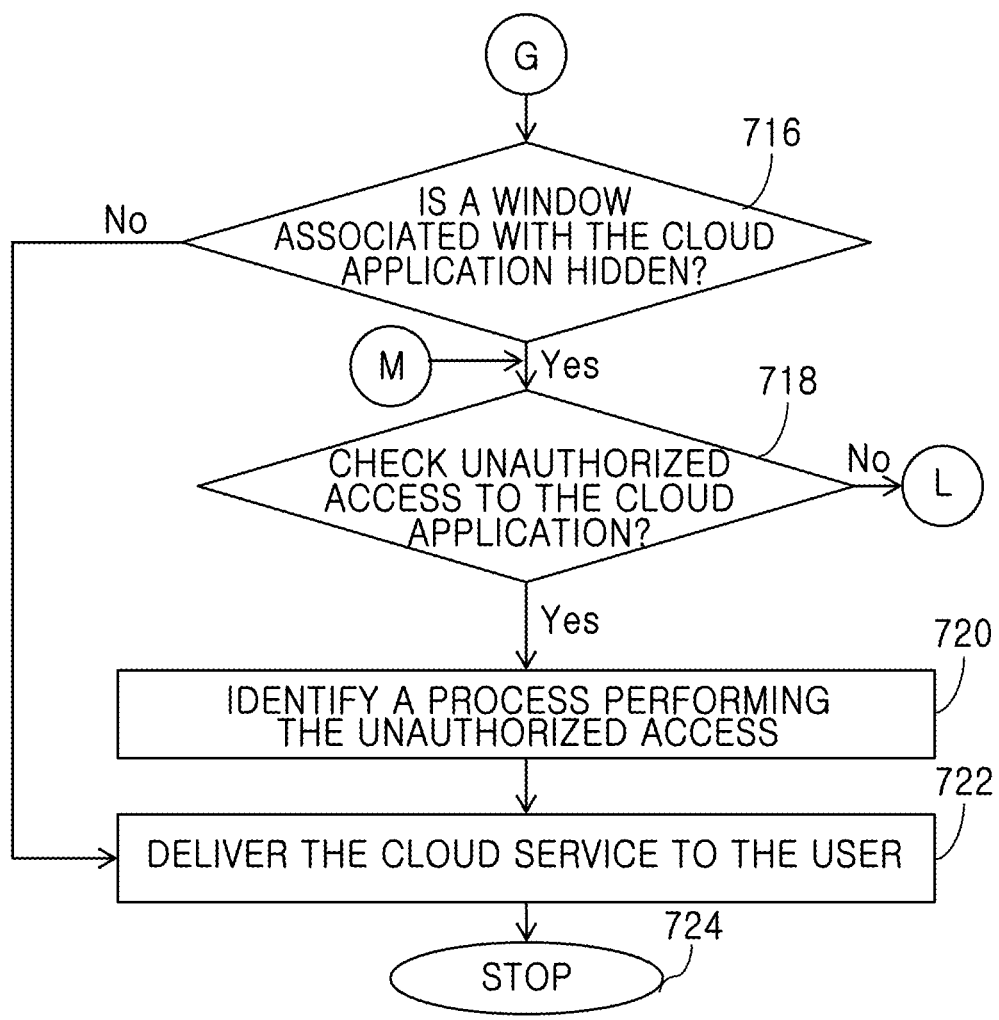
Figure 7C:
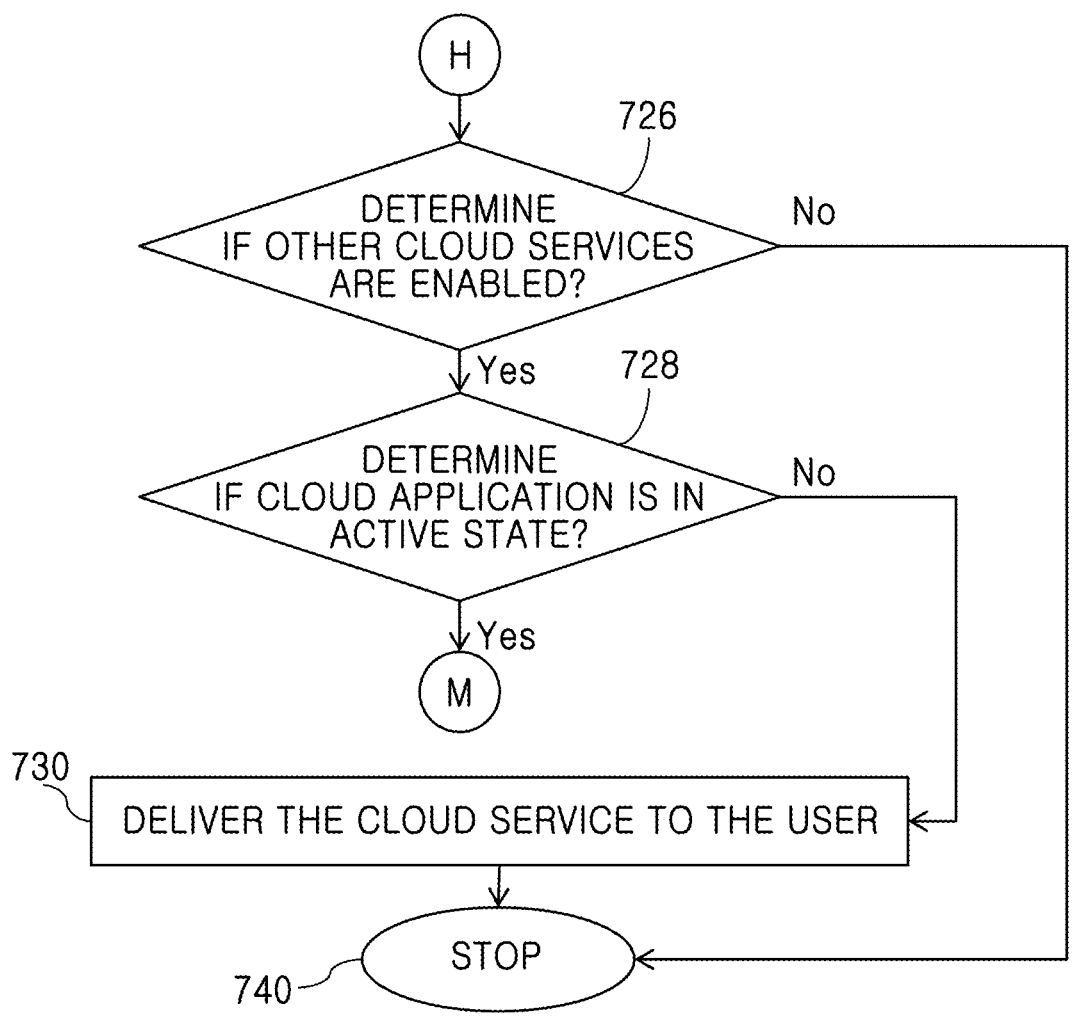
Figure 7D:
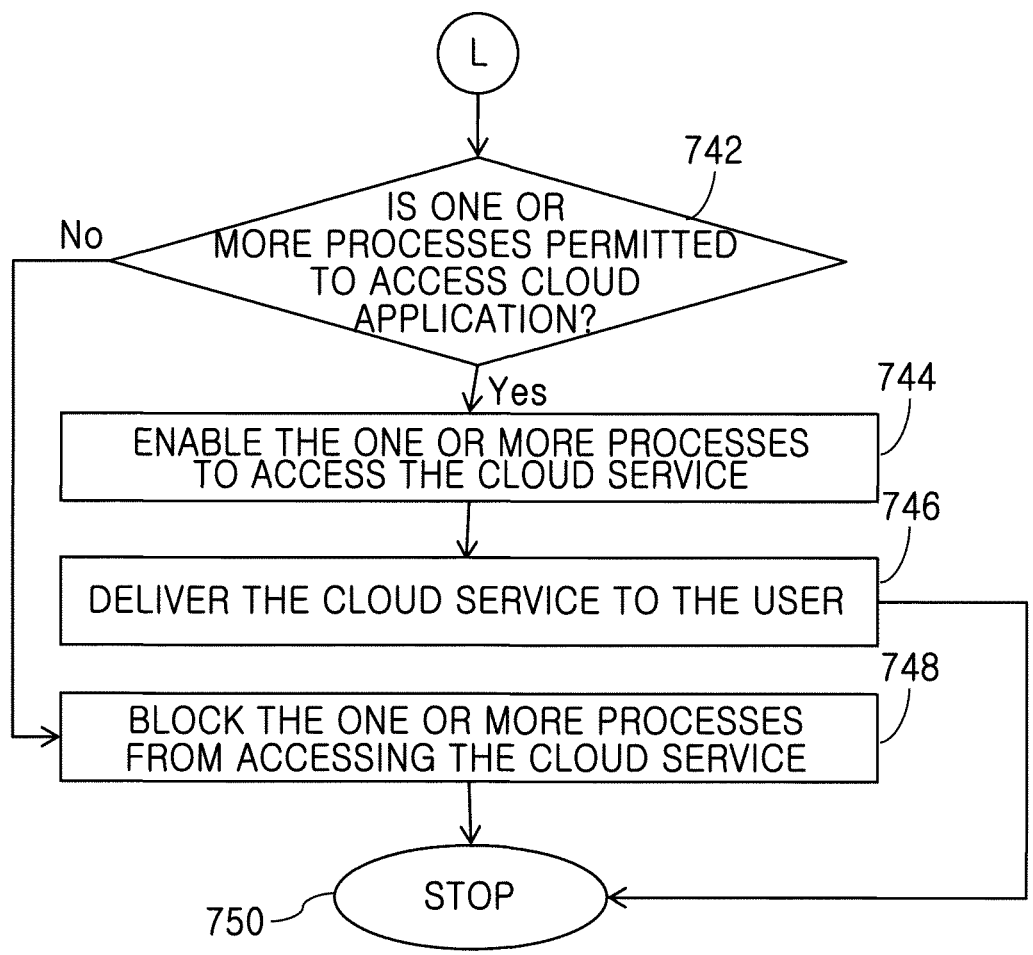

FIGS. 6A and 6B are flowcharts illustrating a method of enabling security of cloud data, in accordance with an exemplary embodiment. The method starts at operation 605.

At operation 610, a cloud service of a user is activated at the user's side. Activation includes preparing terms and conditions, for accessing the cloud 110, by a cloud service provider.

At operation 615, a security control for a video random access memory (VRAM) associated with the cloud service is enabled. In one example, the security control for the VRAM is performed by checking a process identifier (ID) of the VRAM. If the process ID of the VRAM is included in a list of processes that are authorized to access the cloud 110 then the cloud service can be accessed by the user.

At operation 620, a backtrace security is enabled. The backtrace security provides the user with easy access to a comprehensive and large collection of security-related tools, for example, port scanners, password crackers and the like.

At operation 625, an address space associated with the cloud service of the user is protected. The address space is used to execute a process that provides the cloud service to the user. Protection is provided by monitoring unauthorized access to the cloud. Further, the protection is enabled by ensuring the user is not violating terms and conditions, for accessing the cloud, provided by the cloud service provider.

At operation 630, a request for a cloud service is received from the user. The user can send the request using an electronic device capable of accessing the cloud 110.

At operation 635, it is determined if an unauthorized access to the cloud 110 is being performed by the user. Examples of the unauthorized access include, but are not limited to, user sharing the cloud service with other users, a remote user hacking content included in the cloud service, unauthorized reading of the content included in the VRAM and the like. Unauthorized access is determined by ensuring process identifiers associated with various processes are authorized to access the cloud 110. If yes, then the method branches to operation 640. If no, then the method branches to operation 650.

At operation 640, the type of the unauthorized access is determined. Examples of the type of the unauthorized access include, but are not limited to, violation of the terms and conditions by the user, unauthorized access performed by another user, for example, a hacker and the like.

At operation 645, an action is taken against the unauthorized access. Examples, of the action include, but are not limited to, blocking the cloud process that is violating the terms and conditions, notifying the user about the unauthorized access performed by the other user and the like. The action further includes storing information of the cloud process that is performing the unauthorized access to prevent repeated analysis in future. The method stops at operation 650.

FIGS. 7A-7D are flowcharts illustrating a method of monitoring and protecting a cloud application from unauthorized access, in accordance with an exemplary embodiment. The method starts at operation 702.

At operation 704, a request for providing a cloud service is granted to a user. The request may be granted upon, the user, subscribing to a cloud service provider for accessing the cloud 110. A cloud application is executed for delivering the cloud service to the user.

At operation 706, a VRAM driver is updated to support security controls. The VRAM driver enables accessing of a VRAM that stores cloud content for providing the cloud service.

At operation 708, system specific information, software specific information and metadata associated with the user is transmitted to the VRAM driver. Further, process identifier associated with each of one or more processes is also transmitted to the VRAM driver. The one or more processes may be running on an electronic device of the user.

At operation 710, the one or more processes are checked to determine permissibility of the one or more processes to access the VRAM. The VRAM driver makes a list of the one or more processes that are required to be executed to deliver the cloud service to the user. The permissibility of the one or more processes to access the VRAM is determined by comparing the process identifier of each of the processes with a list of process identifiers authorized to access the cloud 110. The list of process identifiers authorized to access the cloud 110 may be stored in a database associated with the user.

At operation 712, a state associated with the cloud application that delivers the cloud service to the user is identified.

At operation 714, it is determined if the state associated with the cloud application is active. If yes, then the method branches to operation 716. If no, then the method branches to operation 726.

At operation 716, it is determined if a window, in the electronic device of the user, associated with the cloud application is hidden. If yes, then the method branches to operation 718. If no, then the method branches to operation 722.

At operation 718, it is determined if an unauthorized access to the cloud application is being performed. If yes, then the method branches to operation 720. If no, then the method branches to operation 742. One or more processes running in the electronic device of the user may perform the unauthorized access to the cloud application. The unauthorized access includes calling a read function on the VRAM by the one or more processes running in the electronic device of the user. The unauthorized access can also include calling a write function on the VRAM by the one or more processes running in the electronic device of the user.

At operation 720, a process performing the unauthorized access to the cloud application is identified. Further, at operation 720, the process is blocked from accessing the cloud application.

At operation 722, the cloud service is delivered to the user and the method stops at 724.

At operation 726, it is determined if one or more cloud services are enabled. Determination is performed when the state associated with the cloud application is inactive or when the window, in the electronic device of the user, associated with the cloud application is not hidden. If yes, then the method branches to operation 728. If no, then the method stops at 740. Examples of the one or more cloud services include, but are not limited to, mail services, computing services and the like.

At operation 728, it is determined if the state associated with the cloud application is active. If yes, then the method loops back to operation 718. If no, then the method branches to operation 730.

At operation 730, the cloud service is delivered to the user and the method stops at 740.

At operation 742, it is determined if the one or more processes, running in the electronic device of the user, are permitted to access the cloud application. If yes then the method branches to operation 744. If no then method branches to operation 748. Determination of the one or more processes, running in the electronic device of the user, that are permitted to access the cloud application is performed when the unauthorized access to the cloud application is not found.

At operation 744, the one or more processes are enabled to access the cloud service.

At operation 746, the cloud service is delivered to the user and the method stops at operation 750.

At operation 748, the one or more processes are blocked from accessing the cloud service since the one or more processes are not permitted to access the cloud application and the method stops at operation 750.

Advantageously, the exemplary embodiments specified in the present disclosure provide an efficient method for securing cloud data at the client end. By enabling security controls at the client side, the cloud contents are secured from unauthorized access prior to providing the cloud services to the user. Hence, clients, cloud service providers and third party supporters are ensured with secure accessibility of the cloud contents. Further, the method prevents the user from sharing the cloud data to other users in an unauthorized manner. Furthermore, the method also enables the third party supporters to protect the copyright of the contents of the third party by the cloud service providers.

In the preceding specification, the present disclosure and its advantages have been described with reference to exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

What is claimed is:

1. A method for providing security of an electronic apparatus, comprising:
   identifying an environment of a client to be provided with a cloud service from at least one cloud server;
   determining one of an address size and an address range of a memory of the client used to execute a cloud process of the cloud service, and executing the cloud process;
   determining and storing a process state of the cloud process in response to the executing the cloud process in the memory;
   monitoring the cloud process accessing the at least one cloud server; and
   preventing an unauthorized access according to a result of the monitoring.

2. The method as claimed in claim 1, further comprising:
   determining a plurality of processes which are executed in the environment of the client;
   monitoring the plurality of processes accessing the at least one cloud server and delivering the cloud service to the client; and
   blocking at least one process which is denied access to the at least one cloud server from among the plurality of processes.

3. The method as claimed in claim 2, further comprising:
   updating system specific information and software specific information in order to monitor the plurality of cloud processes.

4. The method as claimed in claim 3, wherein the updating the system specific information and the software specific information is performed in real time.

5. The method as claimed in claim 1, wherein the monitoring comprises:

determining whether an access of the cloud process is an unauthorized access; and in response to determining the access of the cloud process is unauthorized, determining a type of the unauthorized access, and wherein the preventing the unauthorized access comprises: blocking the unauthorized access; and reporting information regarding the unauthorized access to the at least one cloud server.

6. The method as claimed in claim 5, wherein the type of the unauthorized access includes access which violates terms and conditions by a first user of the client and access by a second user who is not authorized to access the cloud service through the client.

7. The method as claimed in claim 5, further comprising:

in response to the reporting the information regarding the unauthorized access, updating a security function based on the information regarding the unauthorized access by a cloud service provider.

8. The method as claimed in claim 2, further comprising:

suspending monitoring of the plurality of processes in real time; and resuming monitoring of the plurality of processes in real time.

9. An electronic apparatus, comprising:

a communication unit which is configured to perform communication with at least one external cloud server;

a storage; and a processor which is configured to identify an environment of a client to be provided with a cloud service from the at least one external cloud server, determine one of an address size and an address range of a memory of the client used to execute a cloud process of the cloud service, execute the cloud process, determine and store a process state of the cloud process in response to the execution of the cloud process in the memory, monitor the cloud process accessing the at least one external cloud server, and prevent an unauthorized access according to a result of the monitoring.

10. The apparatus as claimed in claim 9, wherein the processor is further configured to determine a plurality of processes which are executed in the environment of the client, monitor the plurality of processes accessing the at least one external cloud server and deliver the cloud service to the client, and blocks at least one process which is denied access to the at least one external cloud server from among the plurality of processes.

11. The apparatus as claimed in claim 9, wherein the storage stores system specific information and software specific information in order to monitor the plurality of cloud processes.

12. The apparatus as claimed in claim 11, wherein the processor updates the system specific information and the software specific information in real time.

13. The apparatus as claimed in claim 9, wherein the processor is further configured to determine whether an access of the cloud process is an unauthorized access, a type of the unauthorized access in response to determining the access of the cloud process is unauthorized, control the communication unit to block the unauthorized access and reports information regarding the unauthorized access to the at least one external cloud server.

14. The apparatus as claimed in claim 13, wherein the type of the unauthorized access includes access which violates terms and conditions by a first user of the client and access by a second user who is not authorized to access the cloud service through the client.

15. The apparatus as claimed in claim 13, wherein, in response the information regarding the unauthorized access being reported, a security function is updated based on the information regarding the unauthorized access by a cloud service provider.

16. The apparatus as claimed in claim 10, wherein the processor suspends monitoring of the plurality of processes in real time and resumes monitoring of the plurality of processes in real time.

* * * * *